July 1, 1958     H. A. PAULSEN     2,840,866
MOVABLE SHELTER–STATIONARY SHELTER CONNECTOR
Filed Nov. 21, 1952     2 Sheets-Sheet 1
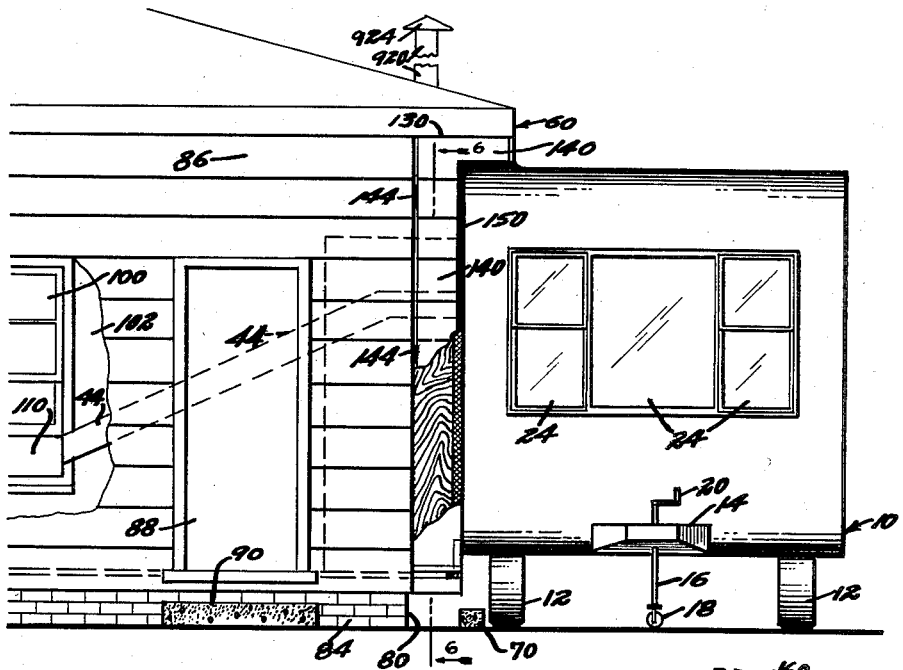
Fig. 1.
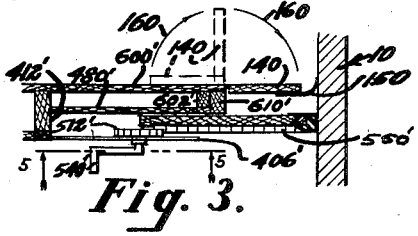
Fig. 3.
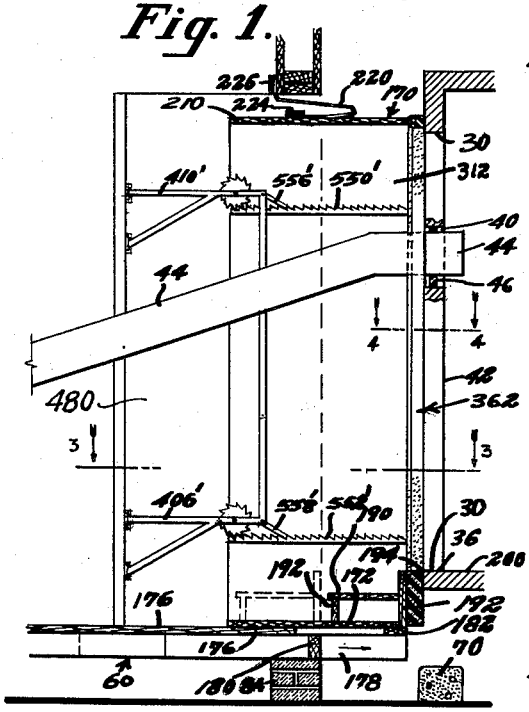
Fig. 2.
Fig. 4.
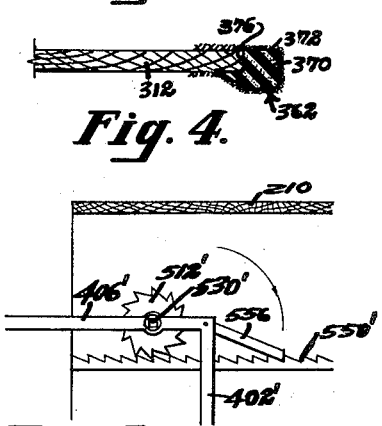
Fig. 5.
INVENTOR.
BY *Harold A. Paulsen*
*A. Hiram Sturges*
*Attorney*

July 1, 1958 H. A. PAULSEN 2,840,866
MOVABLE SHELTER-STATIONARY SHELTER CONNECTOR
Filed Nov. 21, 1952 2 Sheets-Sheet 2
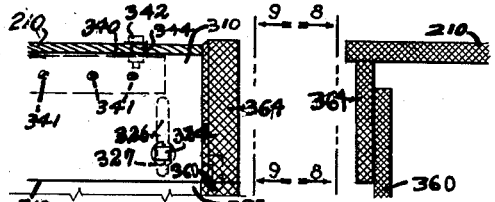
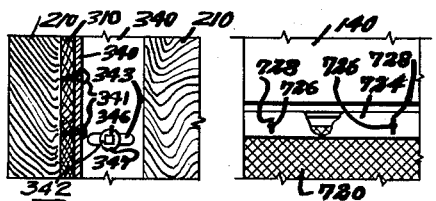
Fig. 8. Fig. 9. Fig. 10. Fig. 11.
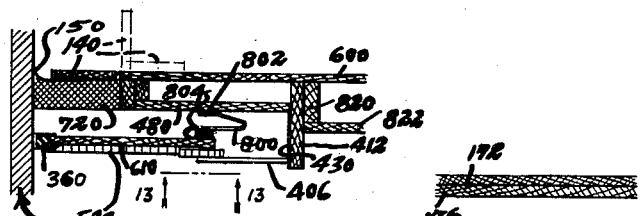
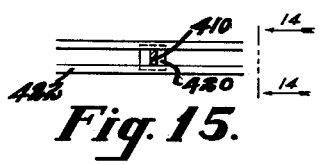
Fig. 12. Fig. 13. Fig. 15.
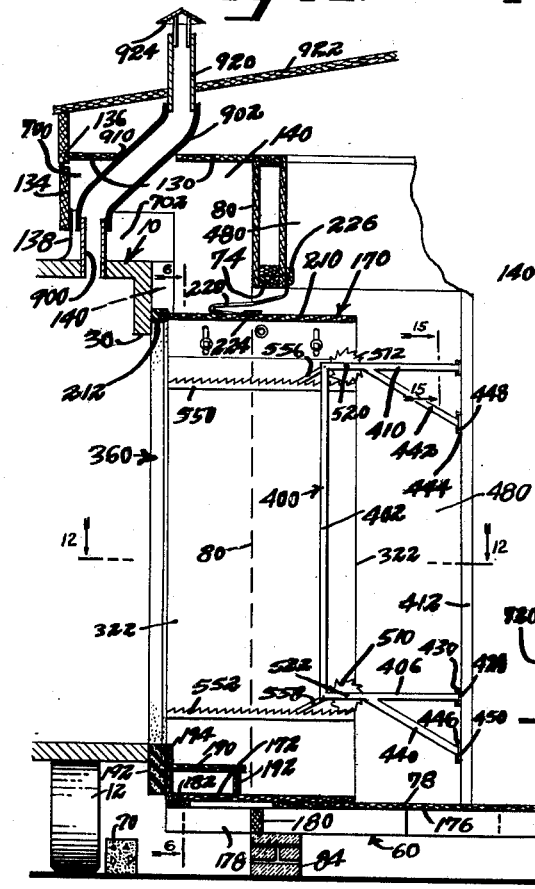
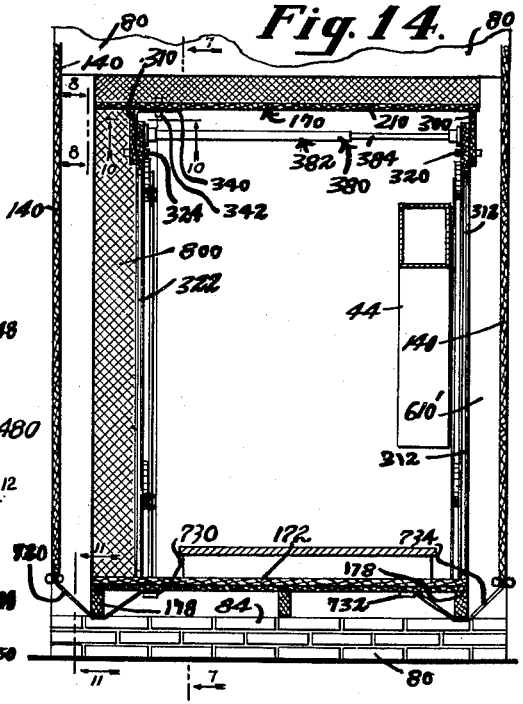
Fig. 7. Fig. 6.
INVENTOR.
BY

United States Patent Office 2,840,866
Patented July 1, 1958

2,840,866

MOVABLE SHELTER-STATIONARY SHELTER CONNECTOR

Harold A. Paulsen, Omaha, Nebr.

Application November 21, 1952, Serial No. 321,894

4 Claims. (Cl. 20—1)

My invention relates to a structure for connecting a movable shelter, such as a house trailer, to a stationary shelter, whereby the two in combination constitute a complete "trailer home."

It is well known that a large part of the population live either permanently or for large periods of time in trailers. Particularly this is true of the service personnel, the transient laborer and a new segment of the population which has come to be recognized in the past decade as permanent trailer dwellers.

Even the largest of trailers provide very cramped quarters for living since a trailer cannot be built over eight feet wide and yet be suitable for highway travel.

Various attempts have been made to expand the living space of the trailer but no one has yet successfully provided a practical way to connect a trailer to a permanent housing structure in a manner whereby it can be rapidly connected or disconnected, and in a way such that the connector provides adequate protection against the elements. Such is a principal object of this invention.

Another object is to add to the living facilities of a trailer a permanent housing structure preferably providing a living room, a private bath, a kitchen and a hallway.

A further object is to provide a connector as described through which a forced ventilation, air-conditioning system can extend and also through which heat could be readily supplied to the trailer.

A further object is to provide a practical way of connecting a stationary housing structure to a trailer with a particular advantage that all present advantages of houses and all future improvements to be made in the facilities of houses can be enjoyed by trailer owners employing the stationary housing structure of this invention.

Yet a further object is to make it possible for trailers to be more economically constructed so as to be more easily purchased by people not having the means for trailers having the many facilities which they have today, such facilities being rentable, and so to speak, from trailer camp owners having stationary housing structures available to be rented to trailer owners.

Yet a further object is to make it possible for young married couples to progress through the development of their housing facilities in stages proportional to their gradually expanding income and in stages proportional to the growth of their families, by making it possible for them first to purchase an economical trailer and then to expand the effective state by attaching first to a smaller stationary housing structure and later to a larger stationary housing structure, which latter can be either rented or bought and later sold to other young couples going through the same expansion process.

Heretofore an attempt has been made to solve this problem by placing a trailer directly alongside the housing structure with the entire side of the trailer which normally has its only one or two doors disposed directly against the housing structure whereby there is no way to escape from the trailer in event of fire except through the permanent structure, and it is an object of this invention to eliminate this hazard by making it possible to connect the trailer to a permanent structure effectively and with the covering of only a small part of the outer surface of the trailer and including only one doorway whereby the other doorway of the trailer is available in the event of fire and for normal use.

A further advantage of this invention is to make this connection possible without depriving the interior of the trailer of much of its natural light as most of the windows of the trailer are not blocked.

A particular advantage to be obtained from the rapid connectability and disconnectability of the invention is to make it possible for trailer owners to disconnect from a permanent housing structure at the beginning of a trip, carrying with them on the trip only that portion of the housing facilities that contains the sleeping quarters and storage facilities and, when their destination is reached, connect again to a similar half home, without shifting individually their clothes and possessions.

As children are now being raised to a great extent in trailers, a particular advantage is to make possible a practical expansion of living facilities for the normal development and growth of children.

Yet a further object is to improve the appearance of trailer communities.

Another object is to provide a way in which trailer communities can be taxed to allay the expenses of school facilities and police and fire protection, and thus to make trailer communities more popular and thereby overcoming present day disfavor.

Yet a further and particular object is to provide a way to interconnect one trailer with another whereby an assembly of two or more trailers can be used to function as a hospital for field use by the army and can be used to provide a movable home whereby it becomes more practical for the trailer owner to own that portion of his home which has been above described as a stationary housing structure, as in this sense, the second trailer could contain all those facilities as above described as part of the stationary housing structure.

A particular object is to make possible the connection of one trailer to one or more other trailers as becomes particularly practical with this invention because it encloses only one of the doorways of the trailer.

Yet a further object is to provide a way of expanding housing facilities through the attachment of trailers one to another without dependency upon tradesmen or local labor conditions, which latter would be needed in the construction of a permanent housing structure.

Yet another object of the invention is to provide a device for the purpose described which is sturdy and durable in construction, reliable and efficient in operation, and relatively simple and inexpensive to manufacture, assemble and utilize.

Trailer owners have regarded the weight of trailers containing all living facilities to be a very serious burden, hampering highway travel considerably, especially uphill grades and sharp curves. It is therefore another object to eliminate the burden of excess weight of these facilities by providing them in a stationary shelter as made practical by this invention.

A further object is to make it possible to economically increase the floor space of hospitals, schools, or factory offices any time and independently of local labor conditions, or supply of building materials, since by using 32' trailers and connectors 2500 square feet of efficient floor space can be added for each 135' of outside wall space.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is an end view of a trailer shown connected by the device of this invention to a stationary shelter. A portion of a shelter is shown broken away for showing an interior connector. A portion of the stationary shelter is shown broken away for showing air conditioner and duct.

Figure 2 is a side elevation similar to Figure 1 but with the forward half portion of the trailer, shelter and connector being broken away in a plane extending vertically through the middle of the doorway of the trailer. One of the shutters which would otherwise be seen is not shown in this view. A broken away sectional segment of the stationary shelter is shown at the top and bottom in Figure 2.

Figure 3 is a view-in-section taken along the line 3—3 of Figure 2. In dotted lines in Figure 3 open positions of a shutter are shown.

Figure 4 is a view-in-section taken along the line 4—4 of Figure 2.

Figure 5 is a side elevation of the ratchet mechanism as would be seen along the line 5—5 of Figure 3.

Figure 6 is a view-in-section taken along the line 6—6 of Figure 1 and looking toward the stationary shelter. The telescoping connecting panels in Figure 6 are designed for expansion whereby Figure 6 forms a modification of the invention as distinguished from Figure 2 which shows the connection panels not telescoping sideways with respect to the trailer door.

Figure 7 is a view-in-section taken along the line 7—7 of Figure 6 and also showing a portion of the stationary shelter.

Figure 8 is a view-in-section taken along the line 8—8 of Figure 6 and along the line 8—8 of Figure 9.

Figure 9 is a view-in-section taken along the line 9—9 of Figure 8. The view of Figure 9 shows the trailer end of the telescoping panel connector and particularly shows the compressible sponge rubber gasket and its telescoping action along a vertical section thereof. The compressible gasket must also telescope.

Figure 10 is a view-in-section taken along the line 10—10 of Figure 6.

Figure 11 is a view-in-section taken along the line 11—11 of Figure 6 and showing a releasable clamping arrangement for clamping a flexible bottom sealing member in place.

Figure 12 is a view-in-section taken along the line 12—12 of Figure 7. This view shows the operation of side and bottom closure members.

Figure 13 is a view-in-section taken along the line 13—13 of Figure 12 showing the floor panel above the permanent floor of the stationary structure.

Figure 14 is a view-in-section taken along the line 14—14 of Figure 15.

Figure 15 is a view-in-section taken along the line 15—15 of Figure 7.

Referring to Figure 1, a house trailer is shown and is generally designated by the numeral 10. The house trailer 10 forms an example of a movable shelter in accordance with this invention.

The trailer 10 is of a conventional type normally having wheels 12, a forwardly protruding portion 14 through which a standard 16 is disposed having a dolly wheel 18 on its lower end for supporting the forward end of the trailer. The standard 16 has a crank 20 on its upper end.

Such trailers conventionally have forward windows 24 and have doorway openings in their sides such as the doorway opening indicated at 30 in Figures 2 and 7. Such doorway openings usually have their upper edges disposed downwardly from the top or roof of the trailer and often have their lower edges at the floor level of the trailer. The floor of the trailer is indicated at Figure 2 at 36.

The trailer 10 is further provided with an opening 40 through the sidewall 42 thereof and on the left hand side of the doorway opening 30 as seen from the outside of the trailer. The opening 40 may be a window opening or may be specially constructed for receiving a duct 44 of this invention. The duct 44 is for air conditioning as later described. The opening 40 is sealed by a blocking member 46 which surrounds the duct 44.

The door of the trailer is not shown as the door can be removed in the use described in this invention or it may be merely left in an open position.

In accordance with this invention a stationary shelter generally indicated at 60 is provided, the shelter 60 being of one or more rooms containing facilities, not shown, complemental to the living facilities of the trailer 10.

The trailer 10 is brought up along the side of the shelter 60 and is guided into a proper position by a curbing 70. The curbing 70 can be seen in Figure 1, Figure 2 and Figure 7. It will be understood that the curbing 70 is preferably as long as the trailer 10 and is preferably still longer for the more efficient guarding.

When the trailer 10 has been brought into the position shown in Figure 1 the doorway opening 30 of the trailer 10 will be disposed opposite an opening in the side of the stationary shelter 60. The opening in the stationary shelter 60 can be best seen at 74 in Figure 7 in which the upper side of the opening is shown. The bottom of the opening is formed by the floor 78 of the stationary shelter 60. The corresponding outer wall of the stationary shelter 60 is indicated at 80 in Figure 7.

The stationary shelter 60 is provided with the foundation wall 84, the previously described side wall 80 adjacent to the trailer 10 and other exterior walls, one of which is shown at 86 in Figure 1.

The stationary shelter 60 can be provided with a side entrance door 88, a stair step 90, and with one or more windows such as that shown at 100, mounted in the outer wall 102 of the stationary shelter 60. The window 100 preferably has an air conditioning unit mounted in it as seen at 110 and connected to the previously described duct 44 which extends to the trailer window 40 for the ventilation of the trailer 10.

The stationary shelter 60 is provided with an overhanging eave 130 which protrudes outwardly over the top of the trailer 10. In Figure 7 a downwardly extending upper shutter 134 is provided which is attached to the outer edge of the eave 130 by hinges, one of which can be seen in Figure 7 at 136.

The upper shutter 134 preferably has a flexible downwardly extending flap 138 attached to the inner side thereof, the flap being of such length as to be bent outwardly at its lower end as seen in Figure 7 to fit tightly against the top of the trailer 10. It will be understood that the upper shutter 134 and its flap 138 extend the full distance between two side shutters 140 of the invention which are spaced substantially to either side of the trailer doorway opening.

The shutters 140 swing horizontally on vertical hinges 144. Each shutter is provided with a vertical flap 150 at its forward edge which is flexible and is adapted to bend when engaging the side wall of the trailer 10, as best seen in Figure 3. A storage position of the shutter 140 is shown in dotted lines at the left in Figure 3 and the shutter swings in the direction of the arrows 160 for engagement with the trailer 10. Inside of the area enclosed by the shutters 134 and 140, a telescoping enclosure means which will be generally indicated by the numeral 170 is provided.

The telescoping enclosure means 170 includes a floor panel 172 which is telescopically disposed slidably above the floor 176 of the stationary shelter 60 as best seen in Figure 2. The floor panel 172 is supported on its outer end by slidably disposed floor joists 178 which extend from the outer end of the floor panel 172 inwardly through notches in a wall-supporting member 180 and underneath the floor 176.

A spacing member 182 is provided between the outer ends of the slidable floor joists 178 and the outer end of the floor panel 172.

The floor panel 172 has a step 190 mounted thereon supported by a riser 192. The outer end of the step 190 is suitably secured to a vertical member 192 which supports a compressible gasket 194 which is adapted to engage the side wall of the trailer 10 beneath the doorway opening 30, preferably fitting flush with the top of the floor 200 of the trailer.

The closure means 170 further includes a roof panel 210 which is horizontally disposed and which has a horizontal, compressible gasket section 212 on its forward edge for engagement with the adjacent outer wall of the trailer 10 above the doorway opening 30.

The space between the uper panel 210 and the upper edge of the opening 74 is closed by a transverse closure member 220 of waterproof material fixed to the top panel 210 by a nailing strip 224 and to the building by a nailing strip 226.

The right and left hand upper side portions 300 and 310 respectively extend downwardly from the top 210. The right hand side portion 300, as best seen in Figure 6, is permanently attached to the top portion 210. The lower end of the section 300 is attached to the right-hand main side panel 312 by means of a bolt and nut assembly 320. The bolt and nut assembly 320 extends through an aperture in the upper side section 300 which fits the bolt 320 tightly, but the bolt 320 extends through a vertical slot in the inner or main side panel 312. This will best be seen in Figure 8 as the right hand side is comparable in this regard to the way the upper side section 310 is secured to the left hand side panel 322 and as illustrated in Figure 8.

Referring to Figure 8, it will be seen that the bolt and nut assembly 324 extends through a tight-fitting aperture in the upper side panel 310 whereby weather cannot enter around the bolt and nut assembly 324. The bolt and nut assembly 324 then extends through a vertical slot 326 in the side panel 322, the slot 326 being dotted as seen in Figure 8. A washer 327 is disposed on the inner side of the slot 326 and as best seen in dotted lines in Figure 8. It will be understood that the bolt and nut assembly 320 as seen on the right hand side in Figure 6 is similarly constructed to the bolt and nut assembly 324 seen on the left hand side in Figure 6 and consequently the right hand side bolt and nut assembly is not illustrated here.

In Figure 10 a bracket 340 can be seen which interconnects the upper side portion 310 to the roof panel 210. The bracket 340 is fixed to the side panel 310 by screws 341 and the bracket 340 is provided with a bolt and nut assembly 342 extending through a slot 343 therein. The slot 343 is disposed extending from side to side of the upper portion of the right angle bracket 340. The slot 343 receives the bolt and nut assembly 342 slidably therethrough, the bolt and nut assembly extending also through an aperture 344, extending through the roof panel 210 and tightly receiving the bolt and nut assembly 342.

It will be understood that when the lower nut 346 is tightened up against a washer 347 disposed between the nut 346 and the walls of the slot 343, that the bracket 340 will be tightly locked to the roof panel 210 in a position for rigidly holding the upper side panel section 310 in place for regulating the width of the enclosure of this invention. The parts shown in Figure 9 are also clearly seen in Figure 10 as taken along the line 10—10 of Figure 6.

As best seen in Figures 7, 8, 9 and 12 a gasket generally indicated at 360 is provided extending along the forward side of the side panel 322. The gasket 360 also has a counter part 362 of similar construction extending along the forward side of the side panel 312. The gasket 360 also has a counter part 364 which extends along the upper left hand side panel section 310 and has a similar gasket extending along the forward or trailer side of the upper side panel 300.

The interior construction of the gasket 362 can be formed of a piece of sponge rubber 370 as best seen in Figure 4. In place of sponge rubber any other suitable compressible material can be used. In order to protect the sponge rubber 370 from the weather a water-proof fabric covering 372 is provided surrounding the rubber gasket 370. The covering 372 extends from the side panel 312 forwardly toward the trailer 10 around the forward side of the gasket member 370 and is secured to the inner side of the panel 312. The gasket member 370 is provided with a recess in its rearward side as shown at 376 for receiving the forward end of the panel 312.

As best seen in Figure 6, a telescoping assembly 380 is provided for guiding the upper ends of the side panels 312 and 322 as the panel 322 is moved sideways of the enclosure for enlarging the width of the enclosure.

The telescoping assembly generally indicated at 380 includes an outer telescoping member 382 slidably receiving therein an inter-telescoping member 384. The members 382 and 384 are suitably secured by flanges or the like to their respective side panels 322 and 312 respectively.

As best seen in Figure 7, means are provided for urging the passageway assembly of this invention toward the trailer from the stationary structure 60. Such means preferably include the framework generally indicated at 400.

The framework assembly 400 preferably includes a framework member 402 which latter is spaced upwardly from the floor panel 172 and is supported at its lower end by a transverse or horizontal member 406 which is attached to the member 402, and is braced at its upper end by a horizontal member 410 attached to the member 402. The rearward ends of the members 406 and 410 are attached by means about to be described to a vertical wall 412 of a short width, the wall 412 being for the specific purpose of supporting the members 406 and 410. As best seen in Figure 15, the member 410 is provided with a track-follower 420 secured transversely thereto and slidably disposed in a horizontal trackway 422. The trackway 422 is attached to the wall 412. It will be understood that the member 406 has a similar track follower shown at 428 in Figure 7 whereby it follows a similar trackway 430, the latter being secured also to the wall 412.

The horizontal frame members 406 and 410 are further braced by diagonally disposed braces 440 and 442 respectively and as shown in Figure 7. The braces 440 and 442 are each provided track followers 444 and 446 respectively for sliding in horizontal tracks 448 and 450 respectively, the trackways 448 and 450 being similar to the trackways 422 and the followers 444 and 446 being similar to the track followers 420 shown in Figure 15.

The short wall 412 is of a height as high from the floor 176 as the upper wall of the opening 74 and the short wall 412 is suitably secured to the adjacent inner wall 480 of the stationary structure.

All parts of the frame 400 have their duplicates on the right hand side of the enclosure as shown in Figure 6. On the forward end of the horizontal members 406 and 410 two ratchet wheels 510 and 512 are provided. The ratchet wheels are rotatably secured to the members 406 and 410 by their axles 520 and 522. The said axles are round as they pass through the members to facilitate rotation and the axles are square on their inner sides as best seen at 530′ in Figure 5.

In order to make the description more clear, in Figures 2 and 5 of the parts of the operable means for forcing the panels toward the trailer will be given the same numbers as those parts shown in Figure 7 but will be provided with prime markings to distinguish therebetween.

Referring to Figure 3, a crank handle 540' is there shown having an end adapted to receive the square portion 530' for rotating the ratchet wheel in order to force the panel toward the trailer. It will be seen that the crank handle 540' is removable whereby it can be used with each of the ratchet wheels.

The ratchet wheels 510 and 512 in Figure 7 are adapted to engage rack bars 550 and 552 respectively, each having complementally shaped teeth on the upper side thereof. The rack bars 550 and 552 are horizontally disposed and are suitably secured to the inner sides of the panel 322. As best seen in Figure 2, there are two rack bars 550' and 552' there shown. In Figure 5 a lock 556' is shown pivotally secured to the forward end of the horizontal frame member 406. The purpose of the latch 556 is to engage in the teeth in the upper side of the rack bar 550' to lock the rack bar in a desired position and to prevent it from moving rearwardly away from the trailer after the ratchet wheels 512 have been rotated sufficiently to force the gaskets on the forward side of the side panels against the trailer sufficiently to compress the gasket.

The lower rack bar 552' of Figure 2 similarly has a latch bar 558' rotatably secured to the forward end of the horizontal frame member 406' and counterpart latch members 556 and 558 will be seen in Figure 7.

It will be understood that other means can be provided for forcing the passageway assembly of this invention against the trailer and that the ratchet means shown is only one example of a way to accomplish this result.

As best seen in Figure 3 a short wall 412' is shown supporting the horizontal frame member 406', the short wall 412' being similar in all respects to the short wall 412 of Figure 7.

Also in Figure 3 is an indication of the probable construction of the side wall of the stationary shelter 60 as in Figure 3 an inner wall 480' is shown and an outer wall 600' is provided, the two being spaced apart by a studding 602'. In Figure 3, an outer vertical member 610' is shown just outwardly of the vertical stud 602', the member 610' forming the left hand side of the opening 74 in the stationary structure 60. The member 610' can also be seen in Figure 6.

As best seen in Figure 3, a side shutter 140 is there shown. It has been previously described and it will be understood that the right hand side of the enclosure of this invention similarly has a shutter 140, the latter being best seen in Figure 7 from the inside. The shutters 140 preferably are of an L shape at their upper end with the horizontal portion of the L extending outwardly over the top of the trailer whereby the said horizontal portion which shall be indicated at 700 in Figure 7 has need of a vertical resilient flap 702 extending downwardly from the lower horizontal surface thereof for engaging the top of the trailer 10 in a bendable fashion. As thus described, the side shutters 140 together with the forward shutter 134 completely enclose the top and sides of the enclosure of this invention.

A connection is provided between the lower ends of the shutter 140 and the floor of the telescoping enclosure. This can be best seen in Figure 12 in which a piece of flexible material is shown at 720, the piece 720 being suitably attached to the lower end of the outer shutter 140, preferably in a manner best seen in Figure 11.

Referring to Figure 11, the flexible material 720 extends upwardly to the bottom end of the shutter 140 and a securing strip 724 extends horizontally along the upper horizontal end of the flexible member 720. The securing strip 724 has apertures therethrough for receiving the shanks of bolts 726. The bolts 726 extend through the lower end of the shutter 140 and extend through the securing strip 724, which latter is rigid, and the bolts 726 are provided on their inner ends with easily removable wing nuts 728 whereby an operator can disconnect a wing nut 728 and its strip 724 for removing the material 720 from the lower end of the shutter 140 when desired.

The inner end of the flexible covering member 720 extends under the adjacent telescoping joint member 178 and extends upwardly beneath and is attached to the lower side of the telescoping floor panel 172. Where the covering 720 is disposed also beneath the forward safety member 182, it is instead attached to the lower side of the forward spacing member 182. The inner edge of the covering 720 is secured in place by a securing strip 730 which is itself secured to the respective members 172 and 182.

It will be understood that a covering member similar to the member 720 is provided for the opposite or right hand side of the enclosure and is attached to the lower side of the shutter 140 and extends under the right hand side one of the floor joists 178 and extends upwardly to and is similarly attached to the floor members 172 and 182 by a similar strip 732. The covering shown on the right hand side in Figure 6 is given the numeral 734.

As best seen in Figure 7, means must be provided for enclosing in the opening which might exist at the forward or trailer edge of the members 720 and 734. This opening is covered by having the members 720 and 734 provided with extra material for extending forwardly to fill this space.

As best seen in Figure 12, means are provided for sealing between the inner wall member 480 and the movable side panel 322. Such means preferably include a flexible piece of material 800 which extends vertically from the upper surface of the floor panel 172 which is engaged upwardly to the upper roof panel 210 which it also engages. The member 800 is secured to the side wall member 480 by a securing strip 802 and is secured to the side wall panel 322 by a securing strip 804.

Also as best seen in Figure 12 the member 720 as there shown passes beneath the edge of the floor panel 172 and beneath the joist 178 to form a closure. The rearward end of the covering 720 engages the vertical member 610 of the stationary structure 60 tightly.

In Figure 12 the outer wall of the stationary structure is continued more so that in Figure 3 whereby a studding 820 is shown on the rearward side of the short wall member 412, the studding having an inner wall 822 on its inner side and having the outer wall 600 of the respective side of the stationary shelter 600 on the outer side of the studding 820.

The purpose of Figure 13 is now obsolete as this figure has been changed somewhat although for sequence of figures this figure is left in.

In operation, it will be seen that the trailer 10 can be guided into position with the aid of the curbing 70 running parallel to the adjacent side of the building 60. The crank 540' can then be used to force the telescoping passageway assembly outward from the stationary shelter 60 to compress its gasket against the side of the trailer 10.

Then the latches 556 and 558' are put in place holding the passageway assembly 170 in the desired position. Just previous to this operation adjustment of the width and heighth of the passageway assembly can be made, if necessary.

Next, the shutters 140 are swung into place and the upper shutter 134 is lowered. Then the flexible closure members 720 and 734 are put in place and the wing nuts 728 are attached.

If the trailer is one having a chimney which would normally come beneath the overhanging portion of the stationary shelter 60 then the chimney, as shown at 900 in Figure 7, can have a flexible connector 902 attached to it, the connector 902 being for conducting exhaust air from the ventilating chimney upwardly through an opening 910 in the stationary shelter 60 and connectable to a chimney 920 extending through the roof 922 of the stationary shelter 60. The chimney 920 can have a cap 924 thereon as described of a type permitting escape of air.

From the foregoing description, it is thought to be obvious that movable shelter stationary-shelter connector constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A passageway assembly for attachment between a stationary shelter and a movable shelter, said stationary structure having a portion overhanging the adjacent side of said movable shelter, said movable shelter having a vertical wall provided with an opening therein, said opening having a top and bottom spaced respectively below and above the top and bottom of said vertical wall, said stationary shelter having an opening therethrough the side walls of which are disposed opposite the side walls of said movable shelter opening, said passageway assembly comprising telescoping closure means for enclosing and defining a passageway between said stationary and movable shelter, said closure means having a floor panel, side closure panels and a roof panel telescoping in relationship to and extending between said shelters to close said passageway, at least one of said side panels being slidable sideways on said floor panel; a compressable gasket secured to and extending along the movable shelter ends of said panels for pressing against said vertical wall of said trailer and sealing the joint between said panels and said movable shelter; operable means to force said panels toward said movable shelter to compress said gasket; locking means to maintain said panels in gasket compressing positions; means for adjustably securing one of said side panels to said top panel for adjustment of the spacing of said side panels for adaption to varying widths of movable shelter doorway opening; means for adjustably securing said side panels to said top panels for adaptation to varying heights of movable shelter doorway opening; two side shutters hingedly attached to said stationary structure and extending vertically one on each side of said passageway assembly from said stationary structure to the adjacent sidewall of said trailer and extending above the roof of said trailer beneath said overhanging portion of said stationary structure; a top shutter extending downwardly from the overhanging portion of said stationary structure to the top of said trailer, said shutters having gaskets of a flexible construction on those edges which are adjacent said trailer for engaging said trailer and pressing against said trailer sidewall and roof respectively to enclose the passageway assembly from the weather on its upper and vertical sides; and means for closing in the space between the bottoms of said side shutters and the said floor to enclose the bottom of said passageway assembly from the weather.

2. A passageway assembly for attachment between a stationary shelter and a movable shelter, said movable shelter having a doorway opening in a vertical wall thereof, said opening having a top and bottom spaced respectively below and above the top and bottom of said vertical wall, said stationary shelter having an opening therethrough the side walls of which are disposed opposite the side walls of said movable shelter opening, said passageway assembly comprising telescoping closure means for enclosing and defining a passageway between said stationary and movable shelters, said closure means having a floor panel, side closure panels and a roof panel telescoping in relationship to and extending between said shelters to close said passageway, at least one of said side panels being slidable sideways on said floor panel; a compressable gasket secured to and extending along the movable shelter ends of said panels for pressing against said vertical wall of said trailer and sealing the joint between said panels and said movable shelter; operable means to force said panels toward said movable shelter to compress said gasket; locking means to maintain said panels in gasket compression positions; means for adjustably securing one of said side panels to said top panel for adjustment of the spacing of said side panels for adaptation to varying widths of movable shelter doorway opening; and means for adjustably securing said side panels to said top panel for adaptation to varying heights of movable shelter doorway opening.

3. A passageway assembly for attachment between a stationary shelter and a movable shelter, said stationary structure having a portion overhanging the adjacent side of said movable shelter, said movable shelter having a vertical wall provided with an opening therein, said opening having a top and bottom spaced respectively below and above the top and bottom of said vertical wall, said stationary shelter having an opening therethrough the side walls of which are disposed opposite the side walls of said movable shelter opening, said passageway assembly comprising telescoping closure means for enclosing and defining a passageway between said stationary and movable shelters, said closure means having a floor panel, side closure panels and a roof panel telescoping in relationship to and extending between said shelters to close said passageway; a compressable gasket secured to and extending along the movable shelter ends of said panels for pressing against said vertical wall of said trailer and sealing the joint between said panels and said movable shelter; operable means to force said panels toward said movable shelter to compress said gasket; locking means to maintain said panels in gasket compressing positions; means for attaching said panels together for simultaneous telescoping movement; two side shutters hingedly attached to said stationary structure and extending vertically one on each side of said passageway assembly from said stationary structure to the adjacent sidewall of said trailer and extending above the roof of said trailer beneath said overhanging portion of said stationary structure; a top shutter extending downwardly from the overhanging portion of said stationary structure to the top of said trailer, said shutters having gaskets of a flexible construction on those edges which are adjacent said trailer for engaging said trailer and pressing against said trailer sidewall and roof respectively to enclose the passageway assembly from the weather on its upper and vertical sides; and means for closing in the spaces between the bottoms of said side shutters and said floor panel to enclose the bottom of said passageway assembly from the weather.

4. A passageway assembly for attachment between a stationary shelter and a trailer having a vertical wall having a doorway opening therethrough, said opening having a top and bottom spaced respectively below and above the top and bottom of said vertical wall, said stationary shelter having a vertical wall having a doorway opening therethrough disposed opposite said trailer opening, said passageway assembly comprising telescoping closure means for enclosing and defining a passageway between said stationary shelter and said trailer, said closure means having a floor panel, side closure panels and a roof panel telescoping in relationship to and extending between said stationary shelter and said trailer to close said passageway; a compressable gasket secured to and extending along the trailer ends of said panels for pressing against said vertical wall of said trailer and sealing the joint between said panels and said trailer; means for maintaining said panels in gasket compressing positions; means for attaching said panels together for simultaneous telescoping movement; said stationary structure having a roof portion overhanging said trailer above said doorway openings, two side shutters attached to said stationary structure and extending vertically one on each side of said passageway assembly from said stationary structure to the adjacent sidewall of said trailer and extending above the roof of said trailer beneath said overhanging portion of said stationary structure; a top shutter extending downwardly from the overhanging portion of said stationary structure to the top of said trailer, said shutters having gaskets of a flexible construction on those edges which are adjacent said trailer for engaging said trailer and pressing against said trailer sidewall and roof respectively to enclose the passageway assembly from the weather on its upper and vertical sides; means for closing in the spaces between the bottoms of said side shutters and said floor panel to enclose the bottom of said passageway assembly from the weather; and means for closing in from the weather the space between the tops of said side shutters and said stationary shelter and trailer.

References Cited in the file of this patent

UNITED STATES PATENTS

| | | |
|---|---|---|
| 1,186,963 | Young | June 13, 1916 |
| 1,256,050 | Schroyer | Feb. 12, 1918 |
| 1,923,124 | Stanley | Aug. 22, 1933 |
| 2,216,547 | Christianson | Oct. 1, 1940 |
| 2,247,340 | Webster | June 24, 1941 |
| 2,354,045 | Nystrom | July 18, 1944 |
| 2,419,750 | Wiberg | Apr. 29, 1947 |
| 2,581,293 | Read et al. | Jan. 1, 1952 |
| 2,648,307 | Bowers | Aug. 11, 1953 |

FOREIGN PATENTS

| | | |
|---|---|---|
| 927,895 | France | May 19, 1947 |